United States Patent
Leblanc et al.

(10) Patent No.: US 10,248,722 B2
(45) Date of Patent: Apr. 2, 2019

(54) MULTI-LANGUAGE SUPPORT FOR DYNAMIC ONTOLOGY

(71) Applicant: Palantir Technologies, Inc., Palo Alto, CA (US)

(72) Inventors: David Leblanc, Ottawa (CA); John Butters, Wellington (NZ); Chris Cook, Wellington (NZ)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 403 days.

(21) Appl. No.: 15/050,263

(22) Filed: Feb. 22, 2016

(65) Prior Publication Data

US 2017/0242922 A1   Aug. 24, 2017

(51) Int. Cl.
  *G06F 7/02*   (2006.01)
  *G06F 17/30*  (2006.01)
  *G06F 17/27*  (2006.01)

(52) U.S. Cl.
  CPC .... *G06F 17/30734* (2013.01); *G06F 17/2785* (2013.01); *G06F 17/30657* (2013.01); *G06F 17/30696* (2013.01)

(58) Field of Classification Search
  CPC ........... G06F 17/2785; G06F 17/30684; G06F 17/30657; G06F 17/30734
  See application file for complete search history.

(56) References Cited

U.S. PATENT DOCUMENTS

| | | | |
|---|---|---|---|
| 5,241,625 A | 8/1993 | Epard et al. | |
| 5,845,300 A | 12/1998 | Corner | |
| 5,999,911 A | 12/1999 | Berg et al. | |
| 6,065,026 A | 5/2000 | Cornelia et al. | |
| 6,226,561 B1 | 5/2001 | Tamaki et al. | |
| 6,232,971 B1 | 5/2001 | Haynes | |
| 6,237,138 B1 | 5/2001 | Hameluck et al. | |
| 6,243,706 B1 | 6/2001 | Moreau et al. | |
| 6,289,338 B1 | 9/2001 | Stoffel et al. | |
| 6,370,538 B1 | 4/2002 | Lamping et al. | |

(Continued)

FOREIGN PATENT DOCUMENTS

| | | |
|---|---|---|
| AU | 2007323689 | 11/2007 |
| AU | 2013251186 | 11/2015 |

(Continued)

OTHER PUBLICATIONS

"A Tour of Pinboard," <http://pinboard.in/tour> as printed May 15, 2014 in 6 pages.

(Continued)

*Primary Examiner* — Bruce M Moser

(74) *Attorney, Agent, or Firm* — Hickman Palermo Becker Bingham LLP

(57) ABSTRACT

A system with methodology for providing multi-language support for dynamic ontology. In one embodiment, for example, a method comprises: storing an ontology for a data store, wherein the ontology comprises a plurality of data types; for each data type of the plurality of data types: storing, in the ontology, one or more display values, wherein each display value is associated with a locale; determining a locale identifier corresponding to a particular locale; selecting a particular display value corresponding to the particular locale; displaying the particular display value.

21 Claims, 4 Drawing Sheets

(56) References Cited

U.S. PATENT DOCUMENTS

| | | |
|---|---|---|
| 6,430,305 B1 | 8/2002 | Decker |
| 6,463,404 B1 | 10/2002 | Appleby |
| 6,523,019 B1 | 2/2003 | Borthwick |
| 6,523,172 B1 | 2/2003 | Martines-Guerra et al. |
| 6,539,538 B1 | 3/2003 | Brewster et al. |
| 6,640,231 B1 | 10/2003 | Andersen et al. |
| 6,665,683 B1 | 12/2003 | Meltzer |
| 6,748,481 B1 | 6/2004 | Parry et al. |
| 6,850,317 B2 | 2/2005 | Mullins et al. |
| 6,877,137 B1 | 4/2005 | Rivette et al. |
| 6,944,821 B1 | 9/2005 | Bates et al. |
| 6,967,589 B1 | 11/2005 | Peters |
| 7,027,974 B1 | 4/2006 | Busch et al. |
| 7,086,028 B1 | 8/2006 | Davis et al. |
| 7,089,541 B2 | 8/2006 | Ungar |
| 7,174,377 B2 | 2/2007 | Bernard et al. |
| 7,194,680 B1 | 3/2007 | Roy et al. |
| 7,213,030 B1 | 5/2007 | Jenkins |
| 7,237,192 B1 | 6/2007 | Stephenson et al. |
| 7,240,330 B2 | 7/2007 | Fairweather |
| 7,392,254 B1 | 6/2008 | Jenkins |
| 7,441,182 B2 | 10/2008 | Beilinson et al. |
| 7,441,219 B2 | 10/2008 | Perry et al. |
| 7,533,069 B2 | 5/2009 | Fairweather |
| 7,685,083 B2 | 3/2010 | Fairweather |
| 7,765,489 B1 | 7/2010 | Shah et al. |
| 7,877,421 B2 | 1/2011 | Berger et al. |
| 7,880,921 B2 | 2/2011 | Dattilo et al. |
| 7,941,336 B1 | 5/2011 | Robin-Jan |
| 7,966,199 B1 | 5/2011 | Frasher |
| 7,958,147 B1 | 6/2011 | Turner et al. |
| 7,962,495 B2 | 6/2011 | Jain et al. |
| 8,010,507 B2 | 8/2011 | King et al. |
| 8,073,857 B2 | 12/2011 | Sreekanth |
| 8,117,022 B2 | 2/2012 | Linker |
| 8,132,149 B2 | 3/2012 | Shenfield et al. |
| 8,271,948 B2 | 9/2012 | Talozi et al. |
| 8,290,838 B1 | 10/2012 | Thakur et al. |
| 8,302,855 B2 | 11/2012 | Ma et al. |
| 8,489,623 B2 | 7/2013 | Jain et al. |
| 8,560,494 B1 | 10/2013 | Downing et al. |
| 8,682,696 B1 | 3/2014 | Shanmugam |
| 8,688,573 B1 | 4/2014 | Rukonic et al. |
| 8,689,182 B2 | 4/2014 | Leithead et al. |
| 8,732,574 B2 | 5/2014 | Burr et al. |
| 8,799,313 B2 | 8/2014 | Satlow |
| 8,807,948 B2 | 8/2014 | Luo et al. |
| 8,855,999 B1 | 10/2014 | Elliot |
| 8,903,717 B2 | 12/2014 | Elliot |
| 8,930,874 B2 | 1/2015 | Duff et al. |
| 8,930,897 B2 | 1/2015 | Nassar |
| 8,938,686 B1 | 1/2015 | Erenrich et al. |
| 8,984,390 B2 | 3/2015 | Aymeloglu et al. |
| 9,009,827 B1 | 4/2015 | Albertson et al. |
| 9,058,315 B2 | 6/2015 | Burr et al. |
| 9,165,100 B2 | 10/2015 | Begur et al. |
| 9,201,920 B2 | 12/2015 | Jain et al. |
| 9,223,773 B2 | 12/2015 | Isaacson |
| 9,589,014 B2 | 3/2017 | Jain et al. |
| 2002/0032677 A1 | 3/2002 | Moregenthaler et al. |
| 2002/0095360 A1 | 7/2002 | Joao |
| 2002/0103705 A1 | 8/2002 | Brady |
| 2002/0194201 A1 | 12/2002 | Wilbanks et al. |
| 2002/0196229 A1 | 12/2002 | Chen et al. |
| 2003/0036927 A1 | 2/2003 | Bowen |
| 2003/0093755 A1 | 5/2003 | O'Carroll |
| 2003/0126102 A1 | 7/2003 | Borthwick |
| 2003/0172053 A1 | 9/2003 | Fairweather |
| 2003/0177112 A1 | 9/2003 | Gardner |
| 2004/0034570 A1 | 2/2004 | Davis |
| 2004/0044648 A1 | 3/2004 | Anfindsen et al. |
| 2004/0044992 A1 | 3/2004 | Muller et al. |
| 2004/0083466 A1 | 4/2004 | Dapp et al. |
| 2004/0205492 A1 | 10/2004 | Newsome |
| 2004/0221223 A1 | 11/2004 | Yu et al. |
| 2004/0236688 A1 | 11/2004 | Bozeman |
| 2004/0236711 A1 | 11/2004 | Nixon et al. |
| 2005/0010472 A1 | 1/2005 | Quatse et al. |
| 2005/0028094 A1 | 2/2005 | Allyn |
| 2005/0039116 A1 | 2/2005 | Slack-Smith |
| 2005/0039119 A1 | 2/2005 | Parks et al. |
| 2005/0091186 A1 | 4/2005 | Alon |
| 2005/0091420 A1 | 4/2005 | Snover et al. |
| 2005/0125715 A1 | 6/2005 | Di Franco et al. |
| 2005/0183005 A1 | 8/2005 | Denoue et al. |
| 2006/0026561 A1 | 2/2006 | Bauman et al. |
| 2006/0031779 A1 | 2/2006 | Theurer et al. |
| 2006/0053097 A1 | 3/2006 | King et al. |
| 2006/0053170 A1 | 3/2006 | Hill et al. |
| 2006/0059423 A1 | 3/2006 | Lehmann et al. |
| 2006/0080139 A1 | 4/2006 | Mainzer |
| 2006/0123027 A1 | 6/2006 | Kohlhammer et al. |
| 2006/0129746 A1 | 6/2006 | Porter |
| 2006/0136513 A1 | 6/2006 | Ngo et al. |
| 2006/0143075 A1 | 6/2006 | Carr et al. |
| 2006/0155654 A1 | 7/2006 | Plessis et al. |
| 2006/0178915 A1 | 8/2006 | Chao |
| 2006/0218163 A1 | 9/2006 | Marcjan et al. |
| 2006/0265417 A1 | 11/2006 | Amato et al. |
| 2006/0277460 A1 | 12/2006 | Forstall et al. |
| 2007/0000999 A1 | 1/2007 | Kubo et al. |
| 2007/0043686 A1 | 2/2007 | Teng et al. |
| 2007/0061752 A1 | 3/2007 | Cory |
| 2007/0074169 A1 | 3/2007 | Chess et al. |
| 2007/0078872 A1 | 4/2007 | Cohen |
| 2007/0112714 A1 | 5/2007 | Fairweather |
| 2007/0113164 A1 | 5/2007 | Hansen et al. |
| 2007/0118357 A1* | 5/2007 | Kasravi ............... G06F 17/273 704/10 |
| 2007/0136095 A1 | 6/2007 | Weinstein |
| 2007/0168871 A1 | 7/2007 | Jenkins |
| 2007/0185850 A1 | 8/2007 | Walters et al. |
| 2007/0233709 A1 | 10/2007 | Abnous |
| 2007/0245339 A1 | 10/2007 | Bauman et al. |
| 2007/0284433 A1 | 12/2007 | Domenica et al. |
| 2007/0299697 A1 | 12/2007 | Friedlander et al. |
| 2008/0016155 A1 | 1/2008 | Khalatian |
| 2008/0091693 A1 | 4/2008 | Murthy |
| 2008/0103830 A1 | 5/2008 | Apacible et al. |
| 2008/0109714 A1 | 5/2008 | Kumar et al. |
| 2008/0140387 A1 | 6/2008 | Linker |
| 2008/0148398 A1 | 6/2008 | Mezack et al. |
| 2008/0172607 A1 | 7/2008 | Baer |
| 2008/0177782 A1 | 7/2008 | Poston et al. |
| 2008/0228467 A1 | 9/2008 | Womack et al. |
| 2008/0249820 A1 | 10/2008 | Pathria et al. |
| 2008/0281580 A1 | 11/2008 | Zabokritski |
| 2008/0313132 A1 | 12/2008 | Hao et al. |
| 2008/0313243 A1 | 12/2008 | Poston et al. |
| 2009/0031401 A1 | 1/2009 | Cudich et al. |
| 2009/0043801 A1 | 2/2009 | LeClair et al. |
| 2009/0089651 A1 | 4/2009 | Herberger et al. |
| 2009/0106178 A1 | 4/2009 | Chu |
| 2009/0112678 A1 | 4/2009 | Luzardo |
| 2009/0112745 A1 | 4/2009 | Stefanescu |
| 2009/0150868 A1 | 6/2009 | Chakra et al. |
| 2009/0172821 A1 | 7/2009 | Daira et al. |
| 2009/0177962 A1 | 7/2009 | Gusmorino et al. |
| 2009/0187546 A1 | 7/2009 | Whyte et al. |
| 2009/0199106 A1 | 8/2009 | Jonsson et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0307049 A1 | 12/2009 | Elliott et al. |
| 2009/0313463 A1 | 12/2009 | Pang et al. |
| 2009/0319891 A1 | 12/2009 | MacKinlay et al. |
| 2010/0011282 A1 | 1/2010 | Dollard et al. |
| 2010/0057622 A1 | 3/2010 | Faith et al. |
| 2010/0070844 A1 | 3/2010 | Aymeloglu et al. |
| 2010/0098318 A1 | 4/2010 | Anderson |

(56) References Cited

U.S. PATENT DOCUMENTS

| | | |
|---|---|---|
| 2010/0204983 A1 | 8/2010 | Chung et al. |
| 2010/0223260 A1 | 9/2010 | Wu |
| 2010/0238174 A1 | 9/2010 | Haub et al. |
| 2010/0262901 A1 | 10/2010 | DiSalvo |
| 2010/0280851 A1 | 11/2010 | Merkin |
| 2010/0306285 A1 | 12/2010 | Shah et al. |
| 2010/0313119 A1 | 12/2010 | Baldwin et al. |
| 2010/0313239 A1 | 12/2010 | Chakra et al. |
| 2011/0047540 A1 | 2/2011 | Williams et al. |
| 2011/0074788 A1 | 3/2011 | Regan et al. |
| 2011/0093327 A1 | 4/2011 | Fordyce et al. |
| 2011/0099133 A1 | 4/2011 | Chang et al. |
| 2011/0161409 A1 | 6/2011 | Nair et al. |
| 2011/0173093 A1 | 7/2011 | Psota et al. |
| 2011/0179048 A1 | 7/2011 | Satlow |
| 2011/0208565 A1 | 8/2011 | Ross et al. |
| 2011/0225482 A1 | 9/2011 | Chan et al. |
| 2011/0258216 A1 | 10/2011 | Supakkul et al. |
| 2012/0004894 A1 | 1/2012 | Butler et al. |
| 2012/0022945 A1 | 1/2012 | Falkenborg et al. |
| 2012/0059853 A1 | 3/2012 | Jagota |
| 2012/0084117 A1 | 4/2012 | Tavares et al. |
| 2012/0084184 A1 | 4/2012 | Raleigh et al. |
| 2012/0123989 A1 | 5/2012 | Yu et al. |
| 2012/0137235 A1 | 5/2012 | Ts et al. |
| 2012/0188252 A1 | 7/2012 | Law |
| 2012/0191446 A1 | 7/2012 | Binsztok et al. |
| 2012/0197657 A1 | 8/2012 | Prodanovich |
| 2012/0197660 A1 | 8/2012 | Prodanovich |
| 2012/0215784 A1 | 8/2012 | King et al. |
| 2012/0221553 A1 | 8/2012 | Wittmer et al. |
| 2012/0226590 A1 | 9/2012 | Love et al. |
| 2012/0284670 A1 | 11/2012 | Kashik et al. |
| 2012/0304150 A1 | 11/2012 | Leithead et al. |
| 2013/0016106 A1 | 1/2013 | Yip et al. |
| 2013/0024268 A1 | 1/2013 | Manickavelu |
| 2013/0054286 A1 | 2/2013 | Oberhofer et al. |
| 2013/0086482 A1 | 4/2013 | Parsons |
| 2013/0091084 A1 | 4/2013 | Lee |
| 2013/0124193 A1 | 5/2013 | Holmberg |
| 2013/0151305 A1 | 6/2013 | Akinola et al. |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0225212 A1 | 8/2013 | Khan |
| 2013/0251233 A1 | 9/2013 | Yang et al. |
| 2013/0208565 A1 | 10/2013 | Castellanos et al. |
| 2013/0275446 A1 | 10/2013 | Jain et al. |
| 2014/0047319 A1 | 2/2014 | Eberlein |
| 2014/0129936 A1 | 5/2014 | Richards |
| 2014/0208281 A1 | 7/2014 | Ming |
| 2014/0222793 A1 | 8/2014 | Sadkin et al. |
| 2014/0244284 A1 | 8/2014 | Smith |
| 2014/0244388 A1 | 8/2014 | Manouchehri et al. |
| 2014/0358829 A1 | 12/2014 | Hurwitz |
| 2015/0026622 A1 | 1/2015 | Roaldson et al. |
| 2015/0046481 A1 | 2/2015 | Elliot |
| 2015/0073954 A1 | 3/2015 | Braff |
| 2015/0089353 A1 | 3/2015 | Folkening |
| 2015/0100559 A1 | 4/2015 | Nassar |
| 2015/0106379 A1 | 4/2015 | Elliot et al. |
| 2015/0142704 A1* | 5/2015 | London .............. G06N 5/04 706/11 |
| 2015/0142766 A1 | 5/2015 | Jain et al. |
| 2015/0212663 A1 | 7/2015 | Papale et al. |
| 2015/0254220 A1 | 9/2015 | Burr et al. |
| 2015/0261847 A1 | 9/2015 | Ducott et al. |
| 2016/0062555 A1 | 3/2016 | Ward et al. |
| 2016/0321245 A1* | 11/2016 | Chisholm .............. G06F 17/289 |
| 2017/0177634 A1 | 6/2017 | Jain et al. |

FOREIGN PATENT DOCUMENTS

| | | |
|---|---|---|
| CA | 2666364 | 1/2015 |
| CN | 102054015 | 5/2014 |
| DE | 102014204840 | 9/2014 |
| DE | 102014215621 | 2/2015 |
| EP | 1672527 | 6/2006 |
| EP | 2221725 | 8/2010 |
| EP | 2778913 | 9/2014 |
| EP | 2778914 | 9/2014 |
| EP | 2778986 | 9/2014 |
| EP | 2911078 | 8/2015 |
| EP | 2993595 | 3/2016 |
| EP | 3062245 | 8/2016 |
| EP | 3208726 | 8/2017 |
| GB | 2366498 | 3/2002 |
| GB | 2513007 | 10/2014 |
| GB | 2518745 | 4/2015 |
| IL | 198253 | 12/2009 |
| NL | 2013306 | 2/2015 |
| WO | WO 2001/025906 | 4/2001 |
| WO | WO 2001/088750 | 11/2001 |
| WO | WO 2002/035376 | 5/2002 |
| WO | WO 2003/060751 | 7/2003 |
| WO | WO 2007/133206 | 11/2007 |
| WO | WO 2008/064207 | 5/2008 |
| WO | WO 2010/030913 | 3/2010 |
| WO | WO 2010/030914 | 3/2010 |
| WO | WO 2011/071833 | 6/2011 |
| WO | WO 2012/119008 | 9/2012 |

OTHER PUBLICATIONS

Abbey, Kristen, "Review of Google Docs," May 1, 2007, pp. 2.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
"BackTult—JD Edwards One World Version Control System," printed Jul. 23, 2007 in 1 page.
Bluttman et al., "Excel Formulas and Functions for Dummies," 2005, Wiley Publishing, Inc., pp. 280, 284-286.
Chaudhuri et al., "An Overview of Business Intelligence Technology," Communications of the ACM, Aug. 2011, vol. 54, No. 8.
Delicious, <http://delicious.com/> as printed May 15, 2014 in 1 page.
Galliford, Miles, "SnagIt Versus Free Screen Capture Software: Critical Tools for Website Owners," <http://www.subhub.com/articles/free-screen-capture-software>, Mar. 27, 2008, pp. 11.
Geiger, Jonathan G., "Data Quality Management, The Most Critical Initiative You Can Implement," Data Warehousing, Management and Quality, Paper 098-29, SUGI 29, Intelligent Solutions, Inc., Bounder, CO, pp. 14, accessed Oct. 3, 2011.
"GrabUp—What a Timesaver!" <http://atlchris.com/191/grabup/>, Aug. 11, 2008, pp. 3.
Gu et al., "Record Linkage: Current Practice and Future Directions," Jan. 15, 2004, pp. 32.
Hua et al., "A Multi-attribute Data Structure with Parallel Bloom Filters for Network Services" HiPC 2006, LNCS 4297, pp. 277-288, 2006.
JetScreenshot.com, "Share Screenshots via Internet in Seconds," <http://web.archive.org/web/20130807164204/http://www.jetscreenshot.com/>, Aug. 7, 2013, pp. 1.
Johnson, Maggie "Introduction to YACC and Bison".
Kahan et al., "Annotea: an Open RDF Infastructure for Shared Web Annotations", Computer Networks, Elsevier Science Publishers B.V., vol. 39, No. 5, dated Aug. 5, 2002, pp. 589-608.
Klemmer et al., "Where Do Web Sites Come From? Capturing and Interacting with Design History," Association for Computing Machinery, CHI 2002, Apr. 20-25, 2002, Minneapolis, MN, pp. 8.
Kokossi et al., "D7-Dynamic Ontoloty Management System (Design)," Information Societies Technology Programme, Jan. 10, 2002, pp. 1-27.
Miklau et al., "Securing History: Privacy and Accountability in Database Systems," 3rd Biennial Conference on Innovative Data Systems Research (CIDR), Jan. 7-10, 2007, Asilomar, California, pp. 387-396.

(56) References Cited

OTHER PUBLICATIONS

Morrison et al., "Converting Users to Testers: An Alternative Approach to Load Test Script Creation, Parameterization and Data Corellation," CCSC: Southeastern Conference, JCSC 28, Dec. 2, 2012, pp. 188-196.
Niepert et al., "A Dynamic Ontology for a Dynamic Reference Work", Joint Conference on Digital Libraries, Jun. 17-22, 2007, Vancouver, British Columbia, Canada, pp. 1-10.
Nitro, "Trick: How to Capture a Screenshot As PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Nivas, Tuli, "Test Harness and Script Design Principles for Automated Testing of non-GUI or Web Based Applications," Performance Lab, Jun. 2011, pp. 30-37.
Online Tech Tips, "Clip2Net—Share files, folders and screenshots easily," <http://www.online-tech-tips.com/free-software-downloads/share-files-folders-screenshots/>, Apr. 2, 2008, pp. 5.
O'Reilly.com, <http://oreilly.com/digitalmedia/2006/01/01/mac-os-x-screenshot-secrets.html> published Jan. 1, 2006 in 10 pages.
Palantir, "Extracting and Transforming Data with Kite," Palantir Technologies, Inc., Copyright 2010, pp. 38.
Palantir, "Kite," https://docs.palantir.com/gotham/3.11.1.0/adminreference/datasources.11 printed Aug. 30, 2013 in 2 pages.
Palantir, "Kite Data-Integration Process Overview," Palantir Technologies, Inc., Copyright 2010, pp. 48.
Palantir, "Kite Operations," Palantir Technologies, Inc., Copyright 2010, p. 1.
Palantir, "The Repository Element," https://docs.palantir.com/gotham/3.11.1.0/dataguide/kite_config_file.04 printed Aug. 30, 2013 in 2 pages.
Palantir, "Write a Kite Configuration File in Eclipse," Palantir Technologies, Inc., Copyright 2010, pp. 2.
Palantir, https://docs.palantir.com/gotham/3.11.1.0/dataguide/baggage/KiteSchema.xsd printed Apr. 4, 2014 in 4 pages.
Palermo, Christopher J., "Memorandum," [Disclosure relating to U.S. Appl. No. 13/916,447, filed Jun. 12, 2013, and related applications], Jan. 31, 2014 in 3 pages.
Schroder, Stan, "15 Ways to Create Website Screenshots," <http://mashable.com/2007/08/24/web-screenshots/>, Aug. 24, 2007, pp. 2.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
SnagIt, "SnagIt 8.1.0 Print Out," Software release date Jun. 15, 2006, pp. 6.
SnagIt, "SnagIt 8.1.0 Print Out 2," Software release date Jun. 15, 2006, pp. 1-3.
Symantec Corporation, "E-Security Begins with Sound Security Policies," Announcement Symantec, Jun. 14, 2001.
Wang et al., "Research on a Clustering Data De-Duplication Mechanism Based on Bloom Filter," IEEE 2010, 5 pages.
Warren, Christina, "TUAW Faceoff: Screenshot apps on the firing line," <http://wvvw.tuaw.com/2008/05/05/tuaw-faceoff-screenshot-apps-on-the-firing-line/>, May 5, 2008, pp. 11.
Wollrath et al., "A Distributed Object Model for the Java System," Conference on Object-Oriented Technologies and Systems, Jun. 17-21, 1996, pp. 219-231.
Official Communication for Great Britain Patent Application No. 1404479.6 dated Jul. 9, 2015.
Official Communication for Netherlands Patent Application No. 2011729 dated Aug. 13, 2015.
Official Communication for European Patent Application No. 12181585.6 dated Sep. 4, 2015.
Official Communication for Netherlands Patent Application No. 2012438 dated Sep. 21, 2015.
Official Communication for European Patent Application No. 15155845.9 dated Oct. 6, 2015.
Official Communication for Great Britain Patent Application No. 1413935.6 dated Dec. 21, 2015.
Official Communication for European Patent Application No. 15188106.7 dated Feb. 3, 2016.
Official Communication for European Patent Application No. 15190307.7 dated Feb. 19, 2016.
Official Communication for Australian Patent Application No. 2014201506 dated Feb. 27, 2015.
Official Communication for Australian Patent Application No. 2014201507 dated Feb. 27, 2015.
Official Communication for Australian Patent Application No. 2014201580 dated Feb. 27, 2015.
Official Communication for Australian Patent Application No. 2013251186 dated Mar. 12, 2015.
Official Communication for European Patent Application No. 14158977.0 dated Apr. 16, 2015.
Official Communication for European Patent Application No. 14158958.0 dated Apr. 16, 2015.
Official Communication for Netherlands Patent Application No. 2013306 dated Apr. 24, 2015.
Official Communication for Canadian Patent Application No. 2831660 dated Jun. 9, 2015.
Official Communication for Great Britain Patent Application No. 1404479.6 dated Aug. 12, 2014.
Official Communication for Great Britain Patent Application No. 1404499.4 dated Aug. 20, 2014.
Official Communication for New Zealand Patent Application No. 628161 dated Aug. 25, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Israel Patent Application No. 198253 dated Nov. 24, 2014.
Official Communication for Great Britain Patent Application No. 1413935.6 dated Jan. 27, 2015.
Official Communication for New Zealand Patent Application No. 622484 dated Apr. 2, 2014.
Official Communication for New Zealand Patent Application No. 622513 dated Apr. 3, 2014.
Official Communication for European Patent Application No. 14158958.0 dated Jun. 3, 2014.
Official Communication for Canadian Patent Application No. 2666364 dated Jun. 4, 2012.
Official Communication for European Patent Application No. 14158977.0 dated Jun. 10, 2014.
Official Communication for New Zealand Patent Application No. 622497 dated Jun. 19, 2014.
Official Communication for New Zealand Patent Application No. 622473 dated Jun. 19, 2014.
Official Communication for European Patent Application No. 14159629.6 dated Jul. 31, 2014.
Notice of Acceptance for Australian Patent Application No. 2013251186 dated Nov. 6, 2015.
Official Communication for New Zealand Patent Application No. 622389 dated Mar. 20, 2014.
Official Communication for New Zealand Patent Application No. 622404 dated Mar. 20, 2014.
Official Communication for New Zealand Patent Application No. 622414 dated Mar. 24, 2014.
Official Communication for New Zealand Patent Application No. 622497 dated Mar. 26, 2014.
Official Communication for New Zealand Patent Application No. 622473 dated Mar. 27, 2014.
U.S. Appl. No. 14/552,336, filed Nov. 24, 2014, First Office Action Interview, dated Jul. 20, 2015.
U.S. Appl. No. 14/552,336, filed Nov. 24, 2014, Notice of Allowance, dated Nov. 3, 2015.
U.S. Appl. No. 14/571,098, filed Dec. 15, 2014, First Office Action Interview, dated Aug. 5, 2015.
U.S. Appl. No. 13/827,491, filed Mar. 14, 2013, Final Office Action, dated Jun. 22, 2015.
U.S. Appl. No. 14/265,637, filed Apr. 30, 2014, Notice of Allowance, dated Feb. 13, 2015.
U.S. Appl. No. 13/669,274, filed Nov. 5, 2012, Final Office Action, dated May 6, 2015.

(56) References Cited

OTHER PUBLICATIONS

U.S. Appl. No. 12/556,321, filed Sep. 9, 2009, Office Action, dated Jul. 7, 2015.
U.S. Appl. No. 14/222,364, filed Mar. 21, 2014, Office Action, dated Dec. 9, 2015.
U.S. Appl. No. 14/800,447, filed Jul. 15, 2012, First Office Action Interview, dated Dec. 10, 2010.
U.S. Appl. No. 14/842,734, filed Sep. 1, 2015, First Office Action Interview, dated Nov. 19, 2015.
U.S. Appl. No. 14/571,098, filed Dec. 15, 2014, First Office Action Interview, dated Nov. 10, 2015.
U.S. Appl. No. 13/827,491, filed Mar. 14, 2013, Office Action, dated Oct. 9, 2015.
U.S. Appl. No. 14/571,098, filed Dec. 15, 2014, First Office Action Interview, dated Aug. 24, 2015.
U.S. Appl. No. 13/669,274, filed Nov. 5, 2012, Advisory Action, dated Aug. 26, 2015.
U.S. Appl. No. 14/044,800, filed Oct. 2, 2013, Notice of Allowance, dated Sep. 2, 2014.
U.S. Appl. No. 14/508,696, filed Oct. 7, 2014, Notice of Allowance, dated Jul. 27, 2015.
U.S. Appl. No. 14/508,696, filed Oct. 7, 2014, Office Action, dated Mar. 2, 2015.
U.S. Appl. No. 14/148,568, filed Jan. 6, 2014, Office Action, dated Mar. 26, 2015.
U.S. Appl. No. 14/571,098, filed Dec. 15, 2014, First Office Action Interview, dated Mar. 11, 2015.
U.S. Appl. No. 14/148,568, filed Jan. 6, 2014, Final Office Action, dated Oct. 22, 2014.
U.S. Appl. No. 14/533,433, filed Nov. 5, 2014, Notice of Allowance, dated Sep. 1, 2015.
U.S. Appl. No. 14/148,568, filed Jan. 6, 2014, Notice of Allowance, dated Aug. 26, 2015.
U.S. Appl. No. 14/025,653, filed Sep. 12, 2013, First Office Action Interview, dated Oct. 6, 2015.
U.S. Appl. No. 14/134,558, filed Dec. 19, 2013, Office Action, dated Oct. 7, 2015.
U.S. Appl. No. 14/883,498, filed Oct. 14, 2015, First Office Action Interview, dated Dec. 24, 2015.
U.S. Appl. No. 14/526,066, filed Oct. 28, 2014, Office Action, dated Jan. 21, 2016.
U.S. Appl. No. 14/871,465, filed Sep. 30, 2015, First Office Action Interview, dated Feb. 9, 2016.
U.S. Appl. No. 14/741,256, filed Jun. 16, 2015, Office Action, dated Feb. 9, 2016.
U.S. Appl. No. 14/841,338, filed Aug. 31, 2015, Office Action, dated Feb. 18, 2016.
U.S. Appl. No. 14/715,834, filed May 19, 2015, First Office Action Interview, dated Feb. 19, 2016.
U.S. Appl. No. 12/556,321, filed Sep. 9, 2009, Final Office Action, dated Feb. 25, 2016.
U.S. Appl. No. 14/025,653, filed Sep. 12, 2013, Interview Summary, dated Mar. 3, 2016.
U.S. Appl. No. 14/954,680, filed Nov. 30, 2015, Notice of Allowance, dated Sep. 28, 2016.
U.S. Appl. No. 14/954,680, filed Nov. 30, 2015, Office Action, dated May 12, 2016.
U.S. Appl. No. 14/630,472, filed Feb. 24, 2015, First Office Action Interview, dated Jun. 23, 2017.
U.S. Appl. No. 14/630,472, filed Feb. 24, 2015, Interview Summary, dated Nov. 1, 2017.
U.S. Appl. No. 14/631,633, filed Feb. 25, 2015, First Office Action Interview, dated Feb. 3, 2016.
Kwout, <http://web.archive.org/web/20080905132448/http://www.kwout.com/> Sep. 5, 2008, pp. 2.
Maluf et al., "An Extenible Schema-Less Database Framework for Managing High-Throughpit Structured Documents," Proceedings of the IASTED International Conference, Computerscience, and Technology, May 21, 2003, pp. 225-230.
Zhuhadar et al., "Multi-lanugage Ontology-Based Search Engine," Advances in Computer-Human Interactions, 2010, ACHI '10, Third International Conference on, IEEE, Piscataway, New Jersey, USA, Feb. 10, 2010, pp. 13-18.
Monitel-Ponsoda et al., "Style Guidelines for Naming and Labeling Ontologies in the Multilingual Web," Proc. Int'l Conf. on Dublin Core and Metadata Applications, Jan. 31, 2011, pp. 105-111.
Official Communication for Israel Patent Application No. 198253 dated Nov. 27, 2013.
Official Communication for Australian Patent Application No. 2007323689 dated Mar. 22, 2011.
Derong et al., "Heterogeneity Resolution Based on Ontology in Web Services Composition," Proceedings of the IEEE International Conference on E-Commerce Technology for Dynamic E-Business, Sep. 13-15, 2004, Beijing China, pp. 274-277.
Karljurand et al., "A Multilingual Semantic Wiki Based on Attempto Controlled English and Grammatical Framework," May 26, 2013, The Semantic Web: Semantics and Big Data, pp. 427-441.
Fahad et al., "Towards Ensuring Satisfiability of Merged Ontology," Procedia Computer Science, vol. 4, Jun. 3, 2011, pp. 2216-2225.
Official Communication for European Patent Application No. 16157174.0 dated Jul. 5, 2016.
Official Communication for European Patent Application No. 07864644.5 dated Jul. 12, 2016.
Pance et al., "Generic Ontology of Datatypes," Information Sciences, vol. 329, Aug. 1, 2015, pp. 900-920.
Official Communication for Australian Patent Application No. 2014201511 dated Feb. 27, 2015.
Palantir, https://docs.palantir.com/gotham/3.11.1.0/dataguide/baggage/KiteSchema printed Aug. 30, 2013 in 1 page.
Official Communication for Canadian Patent Application No. 2666364 dated Oct. 3, 2013.
Official Communication for Netherlands Patent Application No. 2012434 dated Jan. 8, 2016.
International Search Report for International Patent Application No. PCT/US2007/085202 dated Jun. 4, 2009.
Noy et al., "The PROMPT Suite: Interactive Tools for Ontology Merging and Mapping," 2003.
Official Communication for Israel Patent Application No. 198253 dated Jan. 12, 2016.
International Search Report for International Patent Application No. PCT/US2007/85202 dated May 22, 2008.
Official Communication for European Patent Application No. 17152510.8 dated Apr. 19, 2017.
Davis K H ED—Wills L et al.: "Combining a Flexible Data Model and Phase Schema Translations in Data Model Reverse Engineering," Reverse Engineering, 1996, Proceedings of the Third Working Conference, Monterey, CA, USA, Nov. 8-10, 1996, pp. 141-151.
European Claims in application No. 17152510.8-1871, dated Apr. 2017, 3 Pages.

* cited by examiner

MULTI-LANGUAGE SUPPORT FOR DYNAMIC ONTOLOGY

CROSS-REFERENCE TO RELATED APPLICATIONS

This application is related to U.S. patent application Ser. No. 14/630,472, "System with Methodology for Dynamic Modular Ontology," filed Feb. 24, 2015, which is incorporated by reference herein in its entirety. This application is further related to U.S. patent application Ser. No. 13/916,447, now U.S. Pat. No. 8,856,153, "Creating Data in a Data Store Using a Dynamic Ontology," filed Jun. 12, 2013, which is incorporated by reference herein in its entirety. This application is further related to U.S. patent application Ser. No. 13/106,636, now U.S. Pat. No. 8,489,623, "Creating Data in a Data Store Using a Dynamic Ontology," filed May 12, 2011, which is incorporated by reference herein in its entirety. This application is further related to U.S. patent application Ser. No. 11/602,626, now U.S. Pat. No. 7,962,495, "Creating Data in a Data Store using a Dynamic Ontology," filed Nov. 20, 2006, which is incorporated by reference herein in its entirety.

FIELD OF THE INVENTION

The present invention relates to techniques for providing multi-language support for a dynamic ontology.

BACKGROUND

Computer-based database systems typically organize data according to a fixed structure of tables and relationships. The structure may be described using an ontology comprising a data model that is used to represent the structure and reason about objects in the structure. In particular, a dynamic ontology allows a user to specify custom object types, property types, and parser definitions. Examples of a dynamic ontology in a computer system are described in related U.S. patent application Ser. No. 11/602,626, "Creating Data In A Data Store Using A Dynamic Ontology", filed Nov. 20, 2006, and U.S. patent application Ser. No. 14/630,472, "System with Methodology for Dynamic Modular Ontology," filed Feb. 24, 2015, the entire contents of which are hereby incorporated by reference.

Localization is the process of adapting a product to a specific country or region. For software, the visual elements presented by the software need to be presented in the language and format for the specific country or region. Typically, an alternate language version of the software is created for the country or region. However, for an ontology and the database data described by the ontology, it would be inefficient to create copies of the data for each language. Furthermore, with a dynamic ontology where the user specifies custom object types and property types, the software has to be able to present the visual elements of the custom object types and property types in multiple language.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The claims may serve as a summary of the present invention.

DETAILED DESCRIPTION

Figure 1:
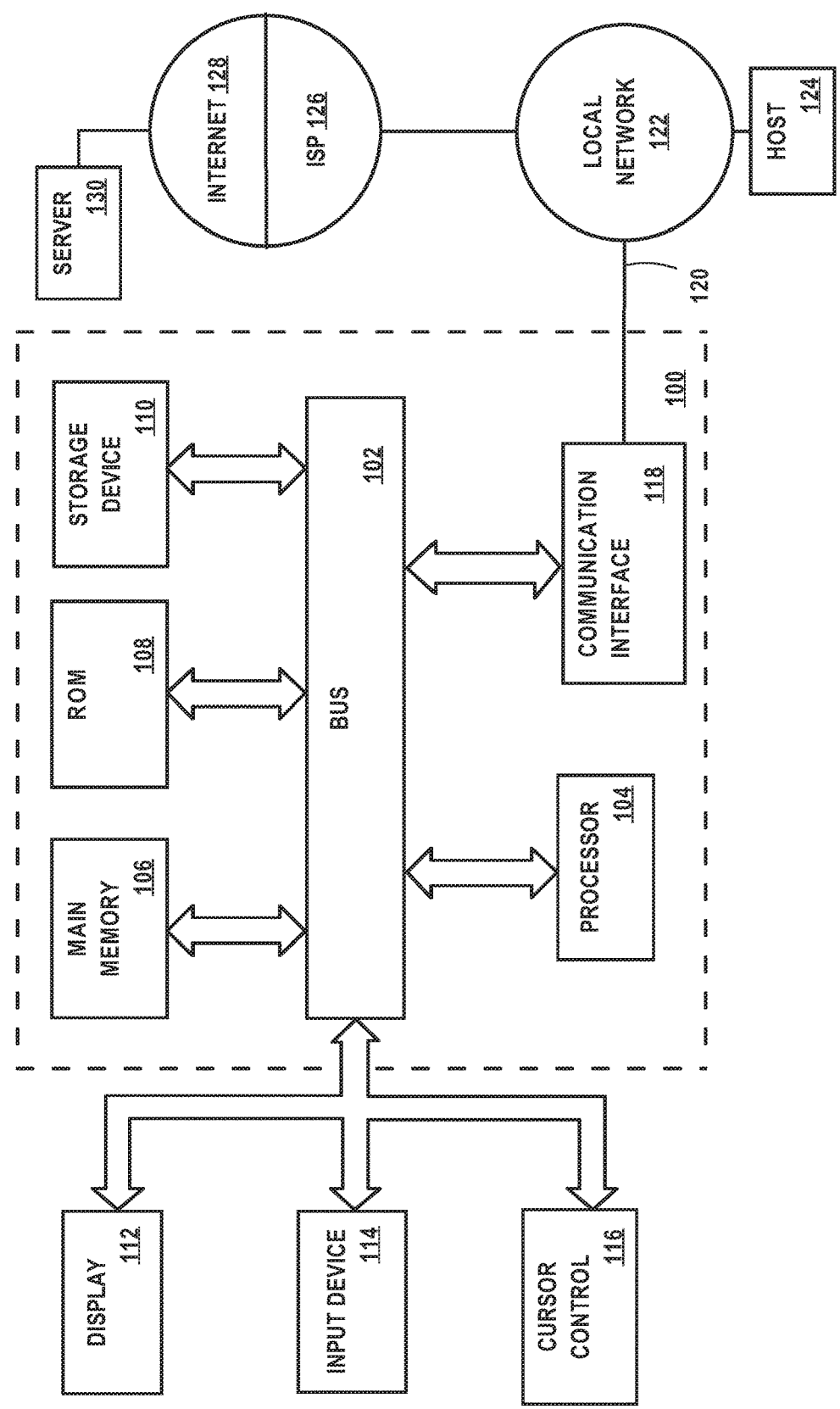
FIG. 1 is a block diagram of an example computing device which may be used for implementing some embodiments of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. As to the flowcharts, each block within the flowcharts represents both a method step and an apparatus element for performing the method step. Depending upon the requirements of the particular implementation at hand, the corresponding apparatus element may be configured in hardware, software, firmware, or combinations thereof.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, without departing from the scope of the invention. The first device and the second device are both devices, but they are not the same device.

The terminology used herein is for the purpose of describing particular limitations only and is not intended to be limiting of the claims. As used in this description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the term "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1.0 GENERAL OVERVIEW

Computer-implemented techniques for selecting alternative display values for data object types and object property types in a dynamic ontology are provided. The techniques provide an improved user interface because it allows for display of a dynamic ontology in multiple languages. In some example embodiments, multiple display values are stored with an ontology definition, where each display value is for a particular locale. For example, the definition for object property type "Eyes" may comprise a display name value of "Eyes" and an alternative display name value of "Yeux" for a French-Canadian locale.

In some example embodiments, an ontology for a data store comprises a plurality of data object types and a plurality of object property types. Each data object type and each object property type have one or more display values that correspond to a locale. Display values may include a display name or a description for the data object type or object property type. Display values may also include one or more enumerated values. Based on a locale specified by a user, the display value corresponding to the specified locale is retrieved and displayed in the user interface.

2.0 BASIC IMPLEMENTING MECHANISMS

Some embodiments of the present invention may be implemented on one or more computing devices. Such a computing device may be implemented in various forms including, but not limited to, a client, a server, a network device, a mobile device, a cell phone, a smart phone, a laptop computer, a desktop computer, a workstation computer, a personal digital assistant, a blade server, a mainframe computer, and other types of computers. The computing device described below and its components, including their connections, relationships, and functions, is meant to be exemplary only, and not meant to limit implementations of some embodiments of the present invention described in this specification. Other computing devices suitable for implementing some embodiments of the present invention may have different components, including components with different connections, relationships, and functions.

2.1 Basic Computing Device

FIG. 1 is a block diagram that illustrates an example computing device 100 suitable for implementing some embodiments of the present invention. Computing device 100 includes bus 102 or other communication mechanism for addressing main memory 106 and for transferring data between and among the various components of device 100. Computing device 100 also includes one or more hardware processors 104 coupled with bus 102 for processing information. A hardware processor 104 may be a general purpose microprocessor, a system on a chip (SoC), or other processor suitable for implementing the described technologies.

Main memory 106, such as a random access memory (RAM) or other dynamic storage device, is coupled to bus 102 for storing information and instructions to be executed by processor(s) 104. Main memory 106 also may be used for storing temporary variables or other intermediate information during execution of instructions to be executed by processor(s) 104. Such instructions, when stored in non-transitory storage media accessible to processor(s) 104, render computing device 100 into a special-purpose computing device that is customized to perform the operations specified in the instructions.

Computing device 100 further includes read only memory (ROM) 108 or other static storage device coupled to bus 102 for storing static information and instructions for processor(s) 104.

One or more mass storage devices 110 are coupled to bus 102 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 110 (e.g., the main hard disk for the device) stores a body of program and data for directing operation of the computing device, including an operating system, user application programs, driver and other support files, as well as other data files of all sorts.

Computing device 100 may be coupled via bus 102 to display 112, such as a liquid crystal display (LCD) or other electronic visual display, for displaying information to a computer user. Display 112 may also be a touch-sensitive display for communicating touch gesture (e.g., finger or stylus) input to processor(s) 104.

An input device 114, including alphanumeric and other keys, is coupled to bus 102 for communicating information and command selections to processor 104.

Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computing device 100 may implement the methods described herein using customized hard-wired logic, one or more application-specific integrated circuits (ASICs), one or more field-programmable gate arrays (FPGAs), firmware, or program logic which, in combination with the computing device, causes or programs computing device 100 to be a special-purpose machine.

Methods disclosed herein may also be performed by computing device 100 in response to processor(s) 104 executing one or more sequences of one or more instructions contained in main memory 106. Such instructions may be read into main memory 106 from another storage medium, such as storage device(s) 110. Execution of the sequences of instructions contained in main memory 106 causes processor(s) 104 to perform the process steps described herein. In some embodiments of the present invention, hard-wired circuitry may be used in place of or in combination with software instructions.

The term "storage media" as used herein refers to any non-transitory media that store data and/or instructions that cause a computing device to operate in a specific fashion. Such storage media may comprise non-volatile media and/or volatile media. Non-volatile media includes, for example, optical disks, magnetic disks, or solid-state drives, such as storage device 110. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor(s) 104 for execution. For example, the instructions may initially be carried on a magnetic disk or solid-state drive of a remote computer. The remote computer can load the instructions into its dynamic memory and send the instructions over a telephone line using a modem. A modem local to computing device 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor(s) 104 retrieves and executes the instructions. The instructions received by main memory 106 may optionally be stored on storage device(s) 110 either before or after execution by processor(s) 104.

Computing device 100 also includes one or more communication interface(s) 118 coupled to bus 102. A communication interface 118 provides a two-way data communication coupling to a wired or wireless network link 120 that is connected to a local network 122 (e.g., Ethernet network, Wireless Local Area Network, cellular phone network, Bluetooth wireless network, or the like). Communication interface 118 sends and receives electrical, electromagnetic, or optical signals that carry digital data streams representing various types of information. For example, communication interface 118 may be a wired network interface card, a wireless network interface card with an integrated radio antenna, or a modem (e.g., ISDN, DSL, or cable modem).

Network link(s) 120 typically provide data communication through one or more networks to other data devices. For example, a network link 120 may provide a connection through a local network 122 to a host computer 124 or to data equipment operated by an Internet Service Provider (ISP) 126. ISP 126 in turn provides data communication services through the world wide packet data communication network now commonly referred to as the "Internet" 128. Local network(s) 122 and Internet 128 use electrical, electromagnetic or optical signals that carry digital data streams. The signals through the various networks and the signals on network link(s) 120 and through communication interface(s) 118, which carry the digital data to and from computing device 100, are example forms of transmission media.

Computing device 100 can send messages and receive data, including program code, through the network(s), network link(s) 120 and communication interface(s) 118. In the Internet example, a server 130 might transmit a requested code for an application program through Internet 128, ISP 126, local network(s) 122 and communication interface(s) 118.

The received code may be executed by processor 104 as it is received, and/or stored in storage device 110, or other non-volatile storage for later execution.

2.2 Basic Software System

Figure 2:
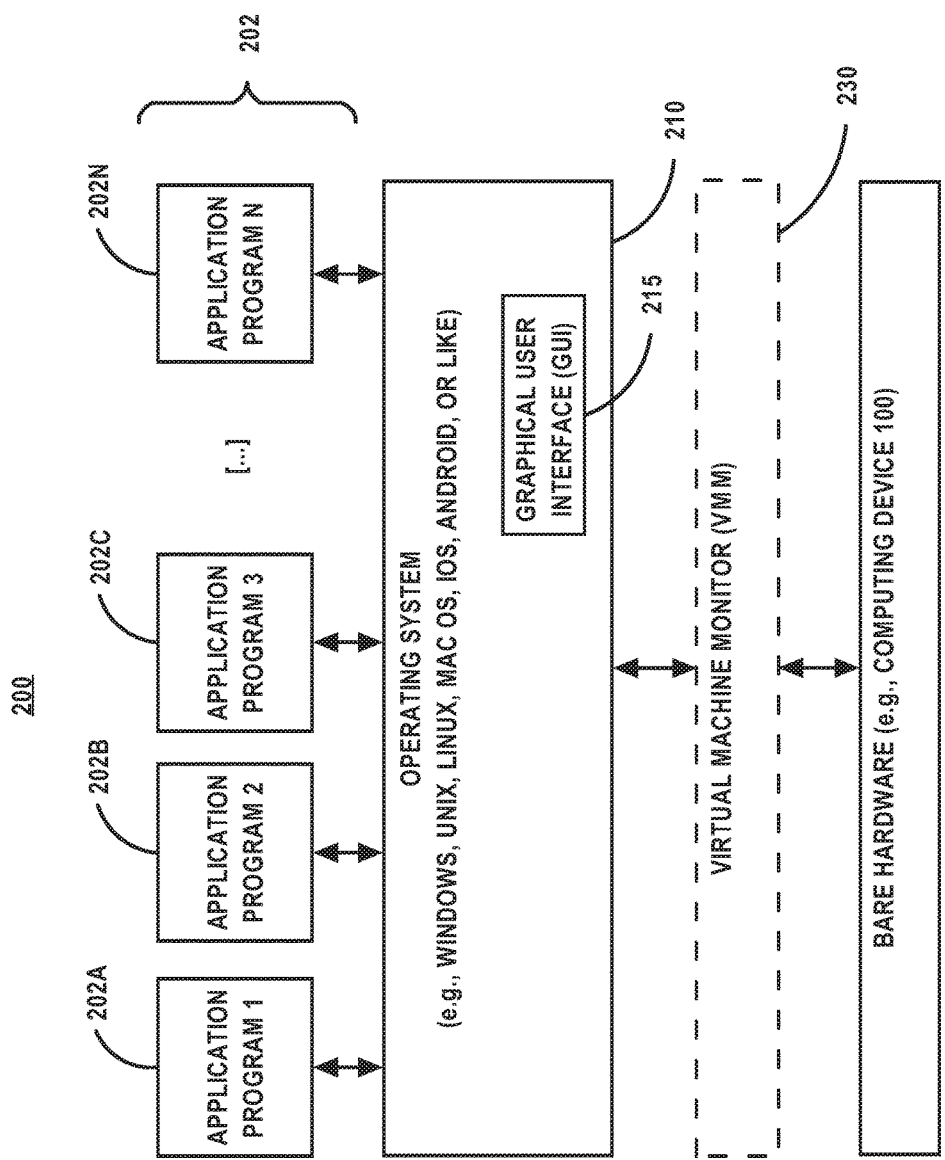
FIG. 2 is a block diagram of a software system for controlling the operation of the example computing device of FIG. 1.

FIG. 2 is a block diagram of a software system for controlling the operation of the example computing device 100 of FIG. 1. As shown, a computer software system 200 is provided for directing the operation of the computing device 100. Software system 200, which is stored in system memory (RAM) 106 and on fixed storage (e.g., hard disk) 110, includes a kernel or operating system (OS) 210. The OS 210 manages low-level aspects of computer operation, including managing execution of processes, memory allocation, file input and output (I/O), and device I/O. One or more application programs, such as client application software or "programs" 202 (e.g., 202A, 202B, 202C . . . 202N) may be "loaded" (i.e., transferred from fixed storage 110 into memory 106) for execution by the system 200. The applications or other software intended for use on the device 100 may also be stored as a set of downloadable computer-executable instructions, for example, for downloading and installation from an Internet location (e.g., Web server).

Software system 200 may include a graphical user interface (GUI) 215, for receiving user commands and data in a graphical (e.g., "point-and-click" or "touch gesture") fashion. These inputs, in turn, may be acted upon by the system 200 in accordance with instructions from operating system 210 and/or client application module(s) 202. The GUI 215 also serves to display the results of operation from the OS 210 and application(s) 202, whereupon the user may supply additional inputs or terminate the session (e.g., log off).

The OS 210 can execute directly on the bare hardware (e.g., processor(s) 104) 220 of device 100. Alternatively, a hypervisor or virtual machine monitor (VMM) 230 may be interposed between the bare hardware 220 and the OS 210. In this configuration, VMM 230 acts as a software "cushion" or virtualization layer between the OS 210 and the bare hardware 220 of the device 100.

VMM 230 instantiates and runs virtual machine instances ("guest machines"). Each guest machine comprises a "guest" operating system, such as OS 210, and one or more applications, such as applications 202, designed to execute on the guest operating system. The VMM 230 presents the guest operating systems with a virtual operating platform and manages the execution of the guest operating systems. In some instances, the VMM 230 may allow a guest operating system to run as through it is running on the bare hardware 220 of the device 100 directly. In these instances, the same version of the guest operating system configured to execute on the bare hardware 104 directly may also be able to execute on VMM 230 without modification or reconfiguration. In other words, VMM 230 may provide full hardware and CPU virtualization to a guest operating system in some instances. In other instances, a guest operating system may be specially designed or configured to execute on VMM 230 for efficiency. In these instances, the guest operating system is "aware" that it executes on a virtual machine monitor. In other words, VMM 230 may provide para-virtualization to a guest operating system in some instances.

The above-described computer hardware and software are presented for purpose of illustrating basic underlying computer components that may be employed for implementing some embodiments of the present invention. Some embodiments of the present invention, however, are not necessarily limited to any particular computing environment or computing device configuration. Instead, some embodiments of the present invention may be implemented in any type of system architecture or processing environment capable of supporting the embodiments as presented in detail below.

3.0 SYSTEM OVERVIEW

Figure 3:
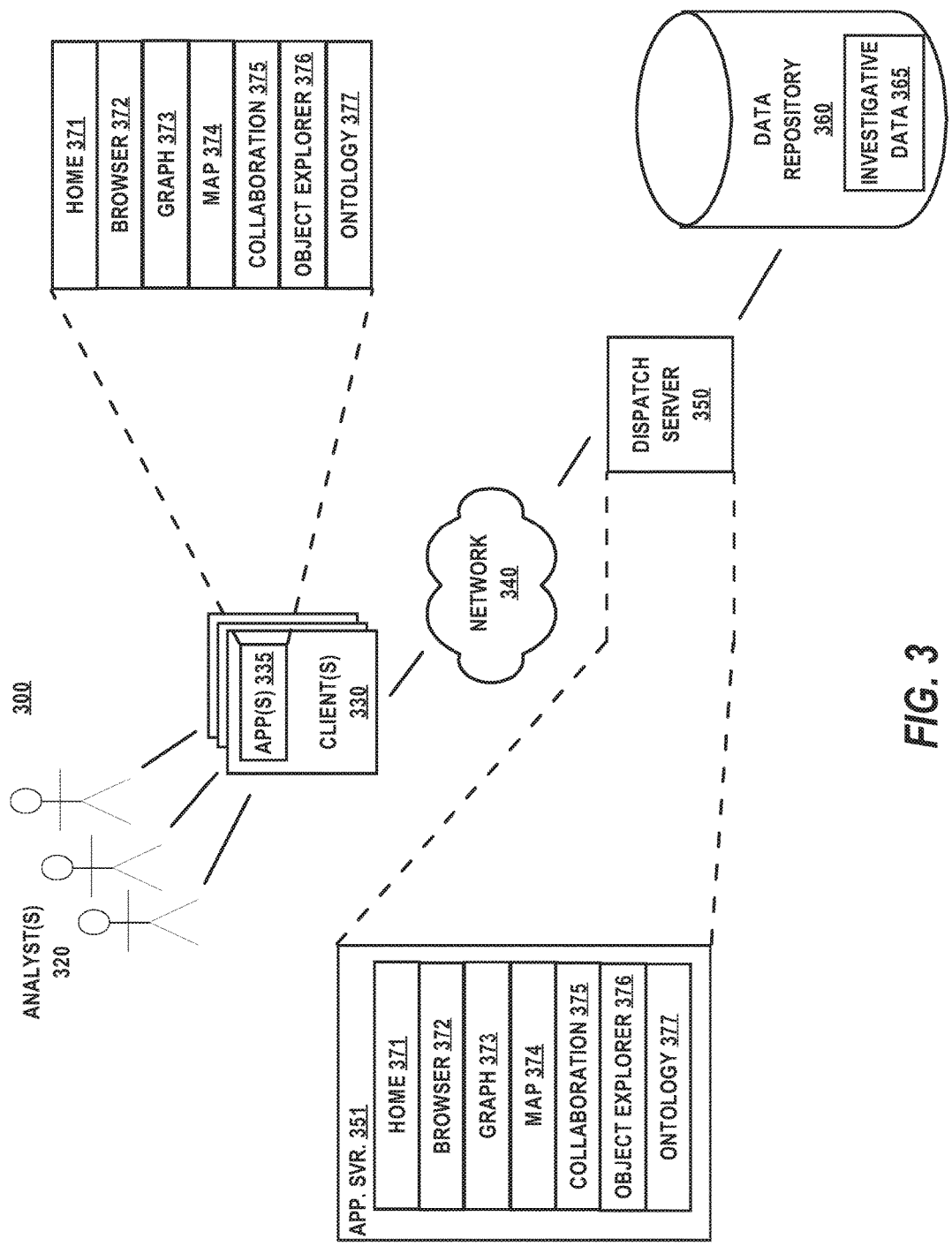
FIG. 3 is a block diagram of a distributed computing environment in which some embodiments of the present invention may be implemented.

While some embodiments of the present invention may operate within a single standalone computing device, the disclosed technologies may be implemented in a distributed computing environment. FIG. 3 is a block diagram of a distributed computing environment 300 in which some embodiments of the present invention may be implemented.

As shown, environment 300 comprises one or more human analysts 320 that use one or more client computing devices 330. The clients 330 are operatively coupled to one or more dispatch server computers 350 by a data network 340. The dispatch server 350 is also operatively coupled to a data repository 360.

In some exemplary embodiments of the present invention, the dispatch server 350 comprises one or more server computing devices that run a conventional server operating system such as MICROSOFT WINDOWS (e.g. XP, VISTA, 7, 8, etc.), MAC OS X, LINUX (e.g., UBUNTU, FEDORA, etc.), or the like.

In some exemplary embodiments of the present invention, the data repository 360 comprises a conventional database management system such as a conventional relational database management system such as ORACLE DATABASE SERVER, or the like.

Network 340 may include a number of conventional wired and/or wireless network systems including, for instance, a cellular telephone network, a Local Area Network (LAN), a Wide Area Network (WAN), the internet, and the like.

In operation, an analyst 320 uses application(s) 335 on a client 330 to access, store, and analyze (i.e., investigate) investigative data 365 stored in the data repository 360, and possibly to collaborate with other analysts 320 across organizational and/or geographical boundaries. The application(s) 335 may drive a graphical user interface that is presented at the clients 330. In some embodiments, the graphical user interface is web browser-based. For example, the graphical user interface may comprise a series of web pages displayed by a conventional web browser application.

The investigative data 365 may comprise virtually any structured (e.g., log files, spreadsheets, tables, etc.) and/or unstructured data (e.g., e-mails, documents, images, videos, etc.) that is the subject of an investigation. In some embodiments, the investigative data 365 is domain-specific. For example, the investigative data 365 may be specific to a health care domain, a financial domain, an intelligence domain, a legal domain, a law enforcement domain, or other domain in which the analysts 320 have particular expertise.

The dispatch server 350 provides a gateway to the application(s) 335 on the clients 330 for accessing and storing the investigative data 365 in the data repository 360 and connects to the data repository 360 that stores the investigative data 365. In operation, the dispatch server 350 handles business logic, manages security and policy controls, and responds to user requests as part of an investigative analysis computing platform. The application(s) 335 may include the following applications (or sets of computer-executable instructions), or a subset or a superset thereof, that an analyst 320 may use to conduct an investigation on the investigative data 365:

a home application 371;
a browser application 372;
a graph application 373;
a map application 374;
a collaboration application 375;
an object explorer application 376; and/or
an ontology application 377.

In conjunction with the hardware components (e.g., memory, disk, CPU, etc.), the operating system, and the graphical user interface of a client 330, the home application 371 may be used by an analyst 320 to start the search and investigative analysis process including: keyword searching the investigative data 365, viewing personalized news feeds, opening existing and new investigations, and editing user accounting settings.

In conjunction with the hardware components (e.g., memory, disk, CPU, etc.), the operating system, and the graphical user interface of a client 330, the browser application 372 may be used by an analyst 320 to view and apply structure to the investigative data 365 including tagging, marking, highlighting, and/or annotating particular words, text, or keywords in the investigative data 365.

In conjunction with the hardware components (e.g., memory, disk, CPU, etc.), the operating system, and the graphical user interface of a client 330, the graph application 373 may be used by an analyst 320 to visually explore semantic relationships within the investigative data 365 including: viewing the investigative data 365 as a graph of nodes and edges, filtering the graph to explore the investigative data 365, and annotating the graph for use in presentations.

In conjunction with the hardware components (e.g., memory, disk, CPU, etc.), the operating system, and the graphical user interface of a client 330, the map application 374 provides geospatial analytic capabilities to an analyst 320 including geo-mapping the investigative data 365 and geo-tagging the investigative data 365.

In conjunction with the hardware components (e.g., memory, disk, CPU, etc.), the operating system, and the graphical user interface of a client 330, the collaboration application 375 may be used by an analyst 320 to build research and discussion communities including: forming teams of analysts 320, exchanging messages with other analysts 320, sharing media rich links to the investigative data 365 with other analysts 320, and sending notification of shared graphs.

In conjunction with the hardware components (e.g., memory, disk, CPU, etc.), the operating system, and the graphical user interface of a client 330, the object explorer application 376 may be used by an analyst 320 to drill down within the investigative data 365 to arrive at interesting sub-sets of the investigative data 365 for further analysis in other applications 335 such as the graph application 373 and/or the map application 374.

In conjunction with the hardware components (e.g., memory, disk, CPU, etc.), the operating system, and the graphical user interface of a client 330, the ontology application 377 may be used by an analyst 320 to customize a dynamic ontology for the investigative data 365 including: adding new data object types, new property types, and new link types to an ontology, deleting unused data object types, property types, and link types from an ontology, and adding and editing parser sets.

Each of the above-identified applications correspond to a set of computer-executable instructions for performing one or more functions described above. These applications (i.e., set of computer-executable instructions) need be implemented as separate software programs, procedures, or applications, and thus various subset of these applications may be combined or otherwise rearranged in some embodiments of the present invention. For example, the browser application 372 may be combined with the object explorer application 376. In some embodiments of the present invention, the application(s) 335 may comprise a subset of the applications identified above. Furthermore, the application(s) 335 may include additional applications not described above.

The dispatch server 350 may include an application server application 351. In conjunction with the hardware components (e.g., memory, disk, CPU, etc.) and the operating system of the dispatch server 350, the application server application 351 may comprise server-side components, procedures, modules, or functions of the application(s) 335. Thus, in some embodiments, an application 335 may have a client-side component, procedure, module or function that executes at the clients 330 and a server-side component, procedure, module or function that executes at the dispatch server 350.

The above-described computer hardware and software are presented for purposes of illustrating the basic underlying computer components that may be employed for implementing some embodiments of the present invention. For purposes of discussion, the following description will present examples in which it will be assumed that there exists a "server" (e.g., dispatch server 350) that communicates with one or more "clients" (e.g., clients 330). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the embodiments of the present invention presented in detail herein.

4.0 DYNAMIC ONTOLOGY OVERVIEW

An ontology may be defined generally as a categorization of the world. According to some embodiments of the present invention, a dynamic ontology is a categorization of a particular investigative world. For example, the particular investigative world may be in a health care domain, a legal domain, a financial analysis domain, a city or state police domain, an intelligence domain, or other specific domain in which investigations on data are conducted by analysts with particular expertise in the specific domain. Domain-specific types of data objects, properties, and links may be defined in a dynamic ontology to support the analysts in a particular field of expertise. A dynamic ontology may be considered dynamic because, according to some embodiments of the present invention, the dynamic ontology can be customized to meet the specific needs of an investigative organization and can be changed as the organization and its assignments evolve.

A "data object" may be defined as a container for data and represents a thing in the real world such as, for example, an entity (e.g. a person, a place, an organization, or other noun), an event (e.g., something that happens at a point in time or for a duration), a document (e.g., a unstructured data source, an e-mail message, a news report, and the like), or a multimedia object (e.g., a rich-media type, video, audio, images, and the like). According to some embodiments, a data object itself comprises a display name and a unique identifier and otherwise does not hold investigative data. Instead, a data object may have one or more "object components" (e.g., properties, links, and notes), which can be multiple. For example, a "person" data object can have multiple "name" properties.

A "property" may be defined as an attribute of a data object. A property may represent individual investigative data items such as a name of a person or a phone number, as just some examples.

A "link" may be defined as a connection between data objects. Various types of connections are possible. For example, a link may represent a familial relationship between two persons or membership relationship between a person and a religious organization.

According to some embodiments of the present invention, a dynamic ontology is defined in an ontology definition. The ontology definition is embodied in a human and computer readable data format such as, for example, eXtensible Markup Language (XML), JavaScript Object Notation (JSON), YAML, or the like.

According to some embodiments, the dispatch server 350 uses the dynamic ontology at runtime to represent the investigative data 365 stored in data repository 360 according to a domain-specific data object model as defined by the dynamic ontology. The dynamic ontology may comprise one or more data type definitions including data object type definitions, property type definitions, link type definitions, or a subset or a superset thereof.

5.0 DYNAMIC ONTOLOGY LOCALIZATION

A locale is a geographical or political area with a particular set of language, date, time, and currency formats. Thus, for a particular locale, text in a graphical user interface must be displayed in the language for that locale. Additionally, values such as dates, times, currency, and numbers may need to be displayed in a particular format. For example, a locale may format the number one million as "1,000,000" while another locale may format the number as "1.000.000."

In an embodiment, the data object types, property types, and link types of the dynamic ontology may respectively comprise one or more attributes that have a display value. The display value is one or more strings that are displayed in the graphical user interface in connection with the associated ontology element. For example, a data object type may comprise a display name attribute and a description attribute.

Each display value must be displayed in the language corresponding to a selected locale. For example, an Eye Color property type may have a display name "Eyes" with a description, "Describes the eye color of the object." A locale that uses French would have a display name "Yeux" with the description, "Décrit la couleur des yeux de l'objet."

An application may be configured with a locale identifier. The "locale identifier" is a unique identifier associated with a locale. For example, a French-Canadian locale may be associated with the locale identifier "fr_CA." The locale identifier indicates a desired locale to use when displaying items in the graphical user interface.

In an embodiment, the locale is identified based on the locale configured with the connected dispatch server. In other embodiments, the locale may be determined based on a locale identifier specified in a configuration file stored on the computer, selected by the analyst within the application, determined by the particular version of the application, or other methods for an analyst to specify a locale preference.

According to an embodiment, an attribute may comprise one or more alternate display values. Each alternate display value is associated with a locale identifier. Thus, each alternate display value corresponds to a particular locale. For the purpose of illustration, assume the ontology is stored in XML format. Code Snippet 1 is an example XML snippet that describes the display name and description for the Age property type.

Code Snippet 1

```
<uri>com.example.property.Eyes</uri>
<displayName>Eyes</displayName>
<alternateDisplayNames>
    <alternateDisplayName>
        <locale>fr_CA</locale>
        <value>yeux</value>
    </alternateDisplayName>
```

-continued

Code Snippet 1

```
    </alternateDisplayNames>
    <description>Describes the eye color of an object.</description>
    <alternateDescriptions>
        <alternateDescription>
            <locale>fr_CA</locale>
            <value>Décrit la couleur des yeux de l'objet.</value>
        </alternateDescription>
    </alternateDescriptions>
```

When the dispatch server uses the dynamic ontology to present information to the application, it uses the selected locale and the locale identifiers associated with the alternate display values to determine a string to display in the graphical user interface.

5.1 Process Overview

Figure 4:
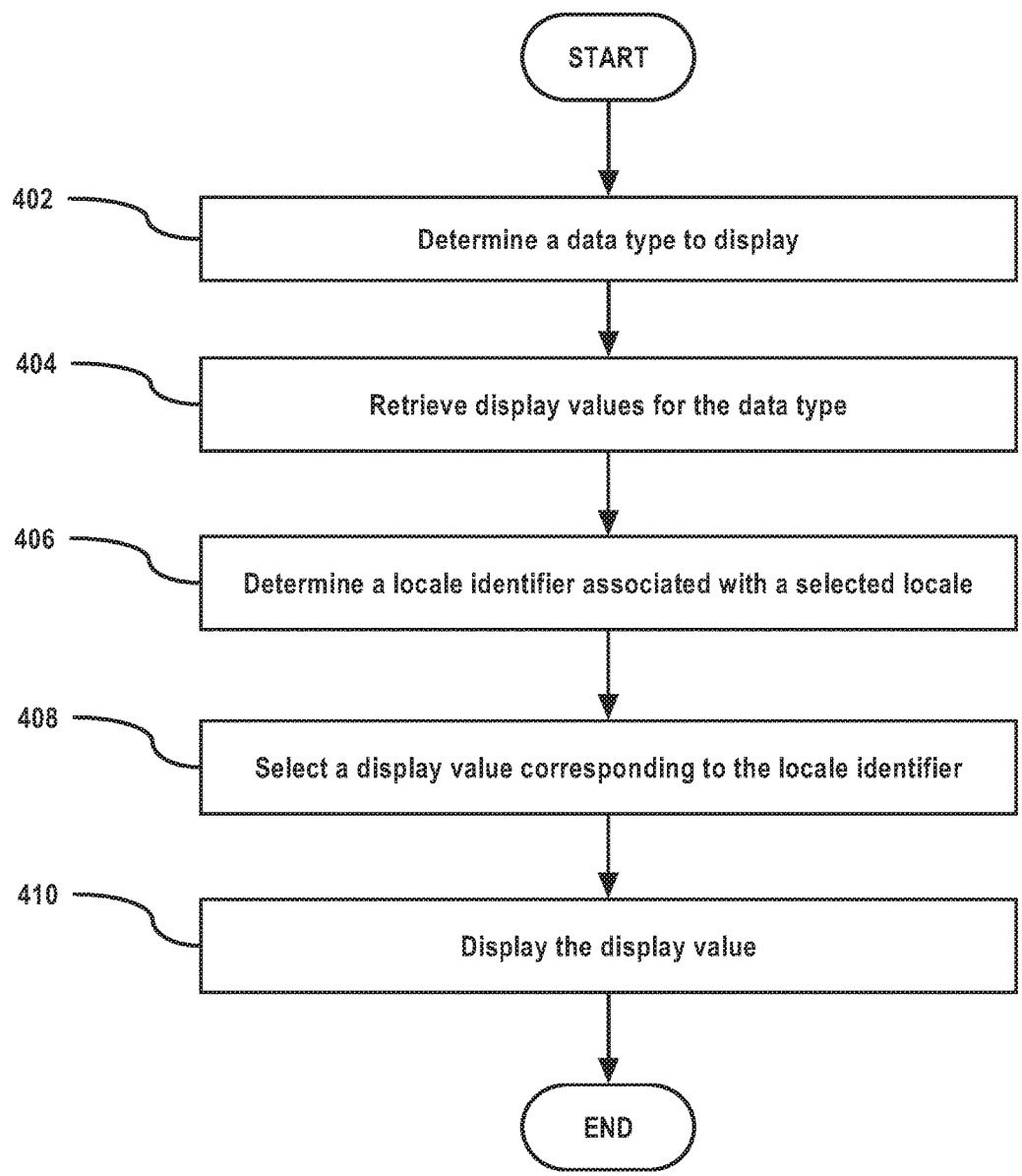
FIG. 4 is a flowchart of a process for displaying display values for a multi-language dynamic ontology according to some embodiments of the present invention.

FIG. 4 is a flowchart of a process 400 for determining a display value according to some embodiments of the present invention. According to some embodiments of the present invention, the process 400 is performed by an application 335. In these embodiments, some of the steps may be performed by a client 330 and some of the steps of the process 400 may be performed by the dispatch server 350. In other embodiments, all of the steps of the process 400 may be performed by a client 330, or all of the steps of the process 400 may be performed by the dispatch server 350. Furthermore, the process 400 may involve performance of additional steps not shown in FIG. 4.

At step 402, the application determines a data type to display, such as a data object type, a property type, or a link type. For example, if the analyst is entering a property of a particular property type in the graphical user interface, the application displays the particular property type. For the purpose of illustration, assume the application displays a property of the Eye Color property type. Although the present example describes displaying a single data type, embodiments of the invention may involve displaying multiple data types concurrently in the graphical user interface.

At step 404, the application retrieves one or more display values for the data type. In an embodiment, data type is associated with a universal resource indicator. The URI is a unique, fully-qualified identifier of the data type. For example, the Eye Color property type may have the URI "com.example.property.Eyes." The application uses the URI to locate the data type in the dynamic ontology and retrieve the display values for each attribute of the data type with a display value. In the present example, the application retrieves the display values for the display name attribute and description attribute of the Eye Color property type.

In an embodiment, an attribute comprises one or more alternate display values. The application retrieves the locale identifier and the value for each alternate display value. In the present example, the application also retrieves the alternate display name and the alternate description corresponding to the locale identifier "fr_CA," for the French Canadian locale.

At step 406, the application determines a locale identifier associated with a selected locale. In an embodiment, the application is configured with a particular locale identifier. In another embodiment, the selected locale is based on the locale associated with the connected dispatch server. The application receives a locale identifier from the dispatch server. In other embodiments, a locale identifier is stored in data associated with the application or set by an analyst during application runtime. In an embodiment, if a locale is not specified or selected, the application may select a default locale.

For the purpose of illustration, assume that the selected locale is French-Canadian. The application determines that the locale identifier associated with the selected locale is "fr_CA."

At step 408, the application selects a display value from the one or more display values for the ontology item. In an embodiment, the application selects the display value based on the locale identifier. In the present example, the application selects the alternate display name and the alternate description associated with the locale identifier "fr_CA." The application retrieves the display name value "Yeux" and the description value, "Décrit la couleur des yeux de l'objet."

In an embodiment, the data type is configured with a default display value. For example, the Eye Color property may have a default display name and a default description. If no display values for an attribute are associated with the locale identifier, then the application may select the default display value.

At step 410, the application displays the selected display value in the graphical user interface.

5.2 Data Object Type

A data object type definition defines a new data object type or extends the definition of an existing data object type. The ontology may contain multiple data object type definitions. In some embodiments, the data object type definition may include a universal resource indicator, a display name attribute, and a description attribute.

The URI may be a unique fully-qualified identifier for the data object type. For example, a Commercial Flight data object type may have the URI "com.example.object.commercialflight."

The display name may be used as a default label for data objects of the data object type. For example, an Airline Flight data object type may have the display name "Commercial Flight."

The description may be used to provide more information regarding the data object type. For example, a Commercial Flight data object type may have the description, "An entity describing a scheduled flight on a commercial aircraft."

According to an embodiment, the data object type definition may comprise one or more alternate display names and/or one or more alternate descriptions, each of which correspond to a particular locale. The alternate display names and/or alternate descriptions comprise a locale identifier and a value. The locale identifier associates the alternate display name and/or alternate description with a particular locale. The value is the display value to use for that particular locale.

5.3 Property Type

A property type definition defines a new property type or extends the definition of an existing property type. The ontology may contain multiple property type definitions. The property type definition may include a universal resource indicator, a display name attribute, a description attribute, one or more validators, one or more formatters, and one or more parsers.

The URI is a unique fully-qualified identifier of the property type. For example, a Name property type may have the URI "com.example.property.Name."

The display name may be used when a property of the property type is displayed in a graphical user interface. For example, a Person data object type may have a Name property type with the display name "Name."

The description may be used to provide more information regarding the property type, such as the general type and structure of the data that a property of the property type can contain. For example, a Name property type may have the description "The name of the Person. This is a unitless property that takes a string."

According to an embodiment, the property type definition may comprise one or more alternate display names and/or one or more alternate descriptions, each of which correspond to a particular locale. The alternate display names and/or alternate descriptions comprise a locale identifier and a value. The locale identifier associates the alternate display name and/or alternate description with a particular locale. The value is the display value to use for that particular locale.

A property type may be based on a base property type. A base property type specifies the general type and structure of the data that a property of the property type can contain. According to some embodiments, the base property type is one of: String, Number, Date, Enumeration, or Composite. If String, then the value of a property of the property type can contain a string of text. If Number, then the value of a property of the property type can contain a number. If Date, then the value of a property of the property type can contain a date.

If the base Enumeration, then the value of a property of the property type can contain one value in a list of predefined enumeration values. The graphical user interface may display a list of the enumeration values for a property of the property type.

In an embodiment, each enumeration value in the list of predefined enumeration values may have one or more alternate enumeration values. The alternate enumeration values comprise a locale identifier and a value. The locale identifier associates the alternate enumeration value with a particular locale. Thus, for a property of the property type, the list of predefined enumeration values may be displayed in the language of a selected locale. In another embodiment, a list of enumeration values is associated with a locale identifier.

If Composite, then the value of a property of the property type may comprise one or more components. Each component may be a String value, a Number value, or a Date value. Each component may also have a display name attribute. The display name may be used when a component of a property of the property type is displayed in a graphical user interface.

Each component may comprise one or more alternate display names. The alternate display names comprise a locale identifier and a value. The locale identifier associates the alternate display name with a particular locale. The value is the display value to use for that particular locale.

5.3.1 Formatter

A formatter may be used to format a value of a property of the property type for display in a graphic user interface. A formatter may define a display rule that governs how the value of a property of the property type is displayed. For example, a formatter for a Name property type may specify that values of properties of that property type are to be displayed: {FIRST_NAME} {LAST_NAME}. Alternatively, the formatter for the Name property type may specify that values of properties of that property type are to be displayed: {LAST_NAME}, {FIRST_NAME}.

In an embodiment, the property type comprises one or more alternate formatters, each corresponding to a particular locale. The formatter may define a display rule that governs how the value of a property of the property type is displayed for the particular locale.

For example, a formatter may define an alternate display value for dates, numbers, or currencies corresponding to a locale. One locale may format the number one million as "1,000,000" while another locale may format the number as "1.000.000." Similarly, a locale may display a date as "MM/DD/YYYY" while another locale may display the date as "DD/MM/YYYY." A currency formatter may specify the use of commas or decimals, such as for the number one million described above, but also may specify a particular currency symbol or currency name for the locale.

5.3.2 Parser

A parser may be used to extract a value for a property of the property type from text data entered by an analyst or other provided text data. A parser may include a regular expression for pattern matching the property value in given text data. In an embodiment, the parser includes a locale identifier for associating the parser with a particular locale. The parser is used to extract a value for a property of the property type when the application locale corresponds with the particular locale.

A date parser may be used to extract the components of a date when it is entered by an analyst or other provided text data. A date may be written in one or more date formats. The date format describes how a date appears in the text data. For example, a "date" format might include the month, the day of month, and the year: "Month/Day/Year." As another example, a "date-time" format might include the month, the day of the month, the year, the hour, and the minute: "Month/Day/Year HH:MM."

A locale may be associated with one or more alternative date formats. For example, an alternative "date" format might include the day of month, the month, and then the year: "Day/Month/Year."

A currency parser defines how currency values are parsed when they is entered by an analyst or other provided text data. A currency parser may include a regular expression for defining a format for currency data. For example, a currency parser may expect dollar sign followed by an amount. An alternative currency parser may be associated with a locale that uses Euros. The alternative currency parser may expect a Euro symbol followed by an amount.

5.4 Link Type

A link type definition defines a new link type or extends the definition of an existing link type. The ontology may contain multiple link type definitions. The link type definition may include a universal resource indicator and a display name attribute.

The URI may be a unique fully-qualified identifier of the link type. For example, the URI of an Employer/Employee link type may be "com.example.link.employerof."

The display name may include a label displayed when a link of the link type is displayed in a graphical user interface. For example, a link of an Employer/Employee link type may have the display name "Employer Of/Employee Of."

According to an embodiment, the link type definition may comprise one or more alternate display names, each of which correspond to a particular locale. An alternate display name comprise a locale identifier and a value. The locale identifier associates the alternate display name with a particular locale. The value is the display value to use for that particular locale.

6.0 EXTENSIONS AND ALTERNATIVES

While the invention is described in some detail with specific reference to a single-preferred embodiment and certain alternatives, there is no intent to limit the invention to that particular embodiment or those specific alternatives. Therefore, those skilled in the art will appreciate that modifications may be made to the preferred embodiment without departing from the teachings of the present invention.

What is claimed is:

1. A method comprising:
at one or more computing devices comprising one or more processors and storage media storing one or more computer programs executed by the one or more processors to perform the method, performing operations comprising:
storing an ontology for a data store, wherein the ontology comprises a plurality of data types; and
for each data type of the plurality of data types, storing, in the ontology, one or more display values in association with a respective locale identifier, wherein each display value indicates how the data type is displayed in a graphical user interface;
for at least a particular data type of the plurality of data types, storing, in the ontology, one or more parsers in association with a respective locale identifier;
determining a particular locale associated with a user computing device;
determining a locale identifier corresponding to the particular locale;
determining one or more data types of the plurality of data types to be displayed in a graphical user interface at the user computing device;
for each data type of the one or more data types, determining a display value corresponding to the particular locale using the locale identifier, and displaying the data type at the user computing device using the display value corresponding to the particular locale;
receiving, from the user computing device via the graphical user interface, input data corresponding to the particular data type;
determining, based on the locale identifier, a particular parser of the one or more parsers corresponding to the particular locale;
parsing the input data using the particular parser.

2. The method of claim 1 wherein, for each data type, determining a display value further comprises:
retrieving the one or more display values for the data type;
selecting from the one or more display values the display value corresponding to the particular locale.

3. The method of claim 1 further comprising:
storing, in the ontology, a default display value not corresponding to a locale.

4. The method of claim 3, further comprising:
determining no display value corresponds to the particular locale;
selecting the default display value; and
displaying the default display value.

5. The method of claim 1 further comprising:
wherein each of the one or more data types comprise one or more attributes;
for each of the one or more attributes:
storing, in the ontology, one or more display values, wherein each display value is associated with a locale;
determining a locale identifier corresponding to a particular locale;
selecting a display value corresponding to the particular locale; and
displaying the display value.

6. The method of claim 1, wherein the data type is one of: a data object type, a property type, or a link type.

7. The method of claim 6 wherein the particular data type is a property type, the method further:
comprising storing the parsed input data in a property of the property type.

8. One or more non-transitory computer-readable media storing computer-executable instructions which, when executed by one or more computing devices, cause the one or more computing devices to perform operations comprising:
storing an ontology for a data store, wherein the ontology comprises a plurality of data types;
for each data type of the plurality of data types, storing, in the ontology, one or more display values in association with a respective locale identifier, wherein each display value indicates how the data type is displayed in a graphical user interface;
for at least a particular data type of the plurality of data types, storing, in the ontology, one or more parsers in association with a respective locale identifier;
determining a particular locale associated with a user computing device;
determining a locale identifier corresponding to the particular locale;
determining one or more data types of the plurality of data types to be displayed in a graphical user interface at the user computing device;
for each data type of the one or more data types, determining a display value corresponding to the particular locale using the locale identifier, and displaying the data type at the user computing device using the display value corresponding to the particular locale;
receiving, from the user computing device via the graphical user interface, input data corresponding to the particular data type;
determining, based on the locale identifier, a particular parser of the one or more parsers corresponding to the particular locale;
parsing the input data using the particular parser.

9. The one or more non-transitory computer-readable media of claim 8, wherein, for each data type, determining a particular display value further comprises:
retrieving the one or more display values for the data type;
selecting from the one or more display values the display value corresponding to the particular locale.

10. The one or more non-transitory computer-readable media of claim 8, the operations further comprising:
storing, in the ontology, a default display value not corresponding to a locale.

11. The one or more non-transitory computer-readable media of claim 10, the operations further comprising:
determining no display value corresponds to the particular locale;
selecting the default display value; and
displaying the default display value.

12. The one or more non-transitory computer-readable media of claim 8, the operations further comprising:
wherein each of the one or more data types comprise one or more attributes;
for each of the one or more attributes:
storing, in the ontology, one or more display values, wherein each display value is associated with a locale;
determining a locale identifier corresponding to a particular locale;

selecting a particular display value corresponding to the particular locale; and displaying the particular display value.

13. The one or more non-transitory computer-readable media of claim 8, wherein the data type is one of: a data object type, a property type, or a link type.

14. The one or more non-transitory computer-readable media of claim 13, wherein the particular data type is a property type, the operations further comprising storing the parsed input data in a property of the property type.

15. A system comprising:

one or more processors;

one or more computer-readable media storing one or more computer programs for execution by the one or more processors, the one or more computer programs comprising instructions for:

storing an ontology for a data store, wherein the ontology comprises a plurality of data types;

for each data type of the plurality of data types, storing, in the ontology, one or more display values in association with a respective locale identifier, wherein each display value indicates how the data type is displayed in a graphical user interface;

for at least a particular data type of the plurality of data types, storing, in the ontology, one or more parsers in association with a respective locale identifier;

determining a particular locale associated with a user computing device;

determining a locale identifier corresponding to the particular locale;

determining one or more data types of the plurality of data types to be displayed in a graphical user interface at the user computing device;

for each data type of the one or more data types, determining a display value corresponding to the particular locale using the locale identifier, and displaying the data type at the user computing device using the display value corresponding to the particular locale;

receiving, from the user computing device via the graphical user interface, input data corresponding to the particular data type;

determining, based on the locale identifier, a particular parser of the one or more parsers corresponding to the particular locale;

parsing the input data using the particular parser.

16. The system of claim 15 wherein, for each data type, determining a particular display value further comprises:

retrieving the one or more display values for the data type;

selecting from the one or more display values the display value corresponding to the particular locale.

17. The system of claim 15, the one or more computer programs further comprising instructions for:

storing, in the ontology, a default display value not corresponding to a locale.

18. The system of claim 17, the one or more computer programs further comprising instructions for:

wherein no display value corresponds to the particular locale;

selecting the default display value; and displaying the default display value.

19. The system of claim 15, the one or more computer programs further comprising instructions for:

wherein each of the one or more data types comprise one or more attributes;

for each of the one or more attributes:

storing, in the ontology, one or more display values, wherein each display value is associated with a locale;

determining a locale identifier corresponding to a particular locale;

selecting a particular display value corresponding to the particular locale; and displaying the particular display value.

20. The system of claim 15, wherein the data type is one of: a data object type, a property type, or a link type.

21. The system of claim 20, wherein the particular data type is a property type, further comprising storing the parsed input data in a property of the property type.

* * * * *